United States Patent [19]

Heitmann

[11] 4,365,308

[45] Dec. 21, 1982

[54] METHOD FOR THE TIME CORRECTION OF A DIGITAL SWITCHING SIGNAL

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 279,746

[22] Filed: Jul. 2, 1981

[30] Foreign Application Priority Data

Jul. 17, 1980 [DE] Fed. Rep. of Germany ....... 3027053

[51] Int. Cl.$^3$ .......................... H03K 5/08; H03N 5/22; G06G 7/30
[52] U.S. Cl. .................................. 364/577; 307/354; 358/183; 328/146
[58] Field of Search .................. 358/183, 22; 328/150, 328/151, 32, 187, 146; 307/354; 365/94; 340/577, 607, 723, 853; 375/24

[56] References Cited

U.S. PATENT DOCUMENTS 4,312,075  1/1982  Murano et al. ..................... 307/354

Primary Examiner—John C. Martin
Attorney, Agent, or Firm—Frishauf, Holtz, Goodman & Woodward

[57] ABSTRACT

The invention concerns a method of time-correcting a digital switching signal. To derive a switching signal from a television signal in conventional analog technique, the television signal is passed through a threshold value device which provides the switching signal when the threshold value is exceeded. In digital processing, however, this can give rise to faults since the exceeding of the threshold value is not recognized until the following scanned value of the digital television signal so that the switching signal is delayed relative to its true position. To avoid this a time correction signal is formed which corresponds to the amount by which the actual switching signal is delayed relative to its true position, and this correction signal is used to produce a series of control signals which effect a progressive switching of the digital signal.

3 Claims, 5 Drawing Figures

METHOD FOR THE TIME CORRECTION OF A DIGITAL SWITCHING SIGNAL

BACKGROUND TO THE INVENTION

This invention relates to a method for the time-correction of a digital switching signal which can occur only at discrete times as a consequence of the scanning process by which the digital signal to be switched is derived and which is therefore delayed relative to its desired time of occurrence.

In television technology switching signals are frequently used which serve to switch from one picture signal source to another within the visible picture. These switching signals are formed in the case of analog technology by passing line or image frequency pulses (for example saw-tooth, triangular or parabolic waveforms), or video signals originating from any desired picture signal source, via a threshold value circuit which generates a switching signal when the applied signal exceeds the threshold value.

However, in digital video technology, which is based upon scanning at discrete times, the exceeding of the threshold value can only be ascertained when the next scanned value of the digital signal is available. Thus if a switching signal is used which is formed by a simple comparator as in analog technology, the signal will in general be delayed relative to the point in time at which the original analog signal would have exceeded the threshold value. This can lead to disturbing saw-tooth structures in the reproduced picture with edges running slighting inclined from the vertical. It is the intention of the present invention to avoid or reduce these faults.

SUMMARY OF THE INVENTION

Accordingly, the invention provides a method for the time-correction of a digital switching signal which can occur only at discrete times as a consequence of the scanning process by which the digital signal to be switched is derived and which is therefore delayed relative to its desired time of occurrence, the method comprising deriving a time correction signal whose value is dependent upon the amount by which the digital switching signal is delayed relative to the desired time, and generating a plurality of control signals at the scanning frequency of the digital signal, the control signals collectively constituting the time-corrected switching signal and having values determined by the value of the time correction signal, the control signals being effective to produce a progressive switching of the digital signal over a plurality of scanning periods.

BRIEF DESCRIPTION OF THE DRAWINGS

An embodiment of the invention will now be described with reference to the accompanying drawings, in which.

DESCRIPTION OF THE PREFERRED EMBODIMENT

Figure 1A:
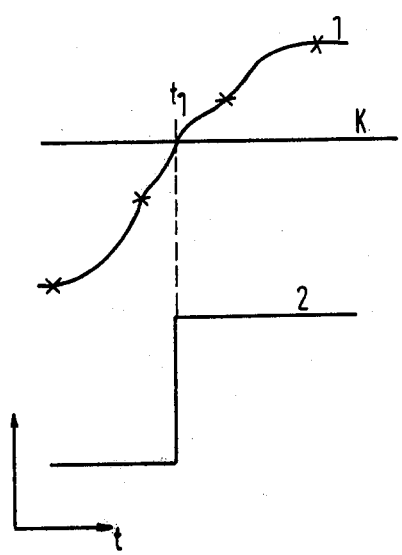
FIG. 1a shows schematically a voltage-time diagram illustrating the formation of a switching signal from an analog picture signal.

FIG. 1a shows an analog picture signal 1 which at $t_1$ exceeds a given threshold k. With the aid of a known analog threshold value circuit (such as a comparator) a switching signal 2 is produced which at $t_1$ exhibits an abrupt increase in amplitude. In television technology this type of switching signal may be used to switch over from one picture signal source to another so that for example rolling sections and so-called stamping tricks can be produced. In the latter case, for example, the blue background of a speaker may be replaced by a picture signal emitted from a slide scanner, so that the viewer has the impression that the speaker is standing before the scene depicted on the slide. Furthermore, with this type of switching signal written characters can be inserted into a television picture.

Figure 1B:
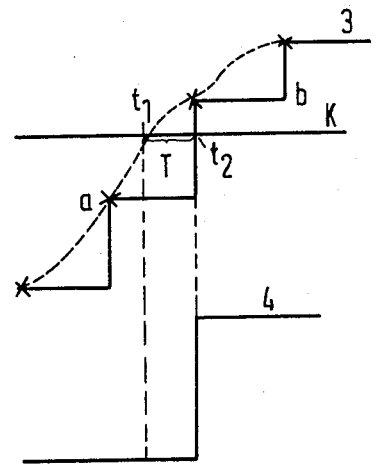
FIG. 1b shows schematically a voltage-time diagram illustrating the formation of a switching signal from a digital picture signal which has been quantized in terms of both time and amplitude.

FIG. 1b shows a digital picture signal 3 which is equivalent to and derived from the analog signal 1 of FIG. 1a by high frequency scanning (sampling) and quantization of the successive scanned values. The signal 3 exceeds the comparator threshold k at time $t_2$. This produces, when a simple threshold value circuit is used, a digital switching signal 4 which has a voltage jump at $t_2$. The analog picture signal 1 on which the digital picture signal is based, and shown in FIG. 1b as a dotted line, coincides at $t_1$ with the threshold k, as before. The correct switching time for the signal 4 should thus be $t_1$. However, at $t_1$ no jump is possible in the signal 4 due to the nature of the digital scanning process.

However, before the actual correction is explained with reference to FIGS. 4 and 5, there follows a discussion of the derivation of the time delay required for the correction.

Figure 2:
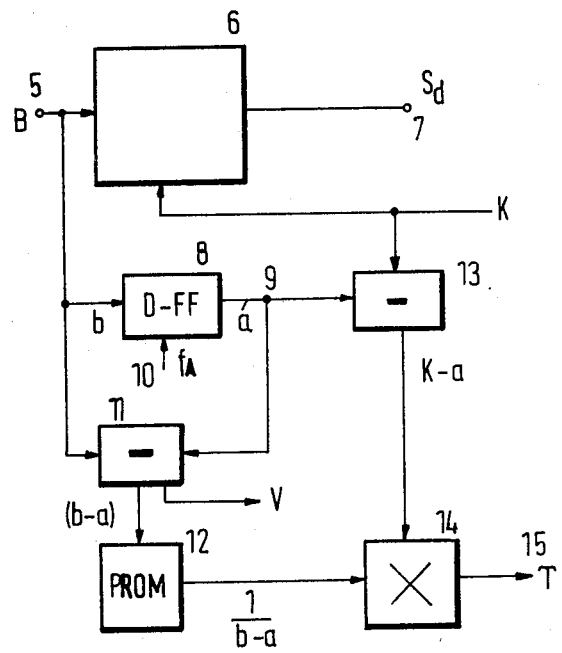
FIG. 2 shows a circuit arrangement for deriving a digital switching signal and a time correction signal used in the embodiment of the invention for correcting the digital switching signal.
Figure 2B:
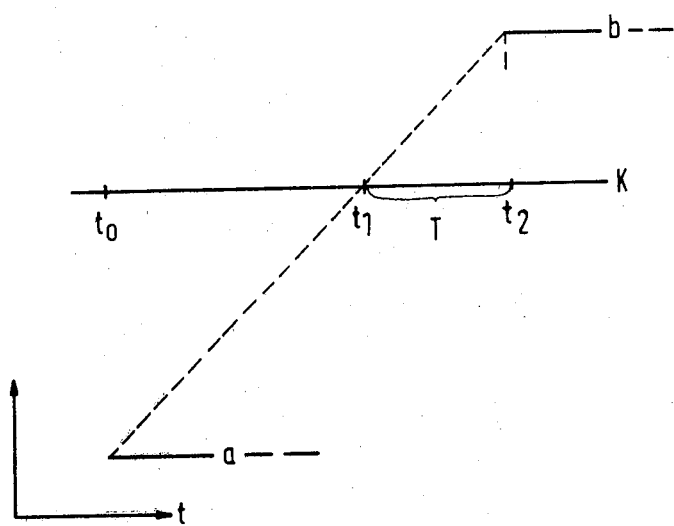
FIG. 2b is a diagram to explain the operation of the circuit arrangement of FIG. 2.

The time correction value is indicated by T and means the time interval between $t_1$ and $t_2$ related to a scanning period TA (FIG. 1b and FIG. 2b). The correction value T is obtained by interpolation between the scanned values a and b lying below and above the threshold k. By inspection of FIG. 2b $$T \approx (k-a)/(b-a)$$

A corresponding circuit arrangement is shown in FIG. 2. The digital picture signal B from which a digital switching signal is to be derived is supplied to the circuit arrangement at input 5. In the digital comparator 6, to which a threshold value signal k is supplied, there is produced a digital switching signal $S_d$ which is available for further use at output 7. In order to form the difference (b−a) the digital picture signal B is supplied to a D flip-flop 8 at the output 9 of which there is obtained the digital picture signal delayed by one scanning period relative to the digital picture signal supplied at 5. For this purpose the scanning frequency $f_A$ is supplied to the D flip-flop at 10. Both the delayed and undelayed digital picture signals are supplied to a subtraction circuit 11, at the output of which the difference (b−a) is formed. In a code converter (PROM) 12 there is formed the reciprocal of this difference signal. The picture signal delayed by one scanning period is further supplied to a second subtraction circuit 13, in which the difference between the threshold value k and the scanning value a is formed. In a multiplication circuit 14 the time correction signal T is produced in digital form which is available at the output 15.

Figure 3:
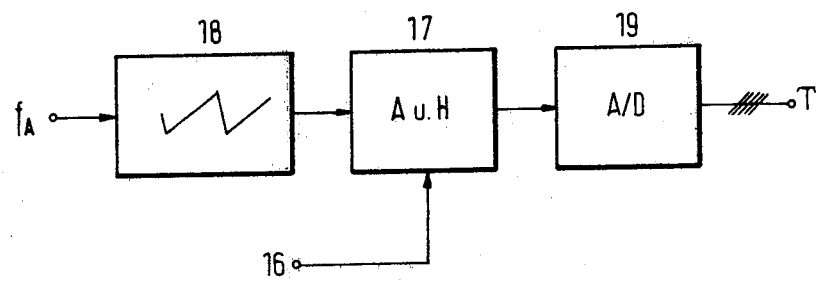
FIG. 3 shows a further circuit arrangement for deriving a time correction signal.

FIG. 3 shows an alternative circuit arrangement for the derivation of the time correction signal T, where it is assumed that a perfectly timed switching signal is available produced by analog technology from the original analog signal 1 in the manner shown in FIG. 1a. This switching signal is supplied to the hold input 16 of a scanning and holding circuit 17. In the circuit 17 a saw-tooth signal is scanned, the latter being produced in a saw-tooth generator 18. The saw-tooth signal has a frequency $f_A$ which corresponds to the scanning frequency of the digital system. Depending on the phase displacement between the perfectly timed switching signal supplied at 16 and the scanning period of the digital system, an instantaneous value of the saw-tooth signal is held in the scanning and holding circuit 17. This is then converted in an analog-digital converter 19 into a digital time correction signal T.

In the following explanation for the actual time-correction of the digital switching signal $S_d$ using the time correction signal T, it is assumed that it is not necessary to switch instantaneously from one digital signal source to the other, that is to execute a jump which has the maximum amplitude change from one scanning value to the next. On the contrary, this kind of jump is strictly speaking not permitted in digital systems which are based on the scanning of analog signals, since this can give rise to frequencies which lie above half the scanning frequency. A progressive switching of the digital signal is therefore provided, the principles of which are illustrated in FIG. 4.

Figure 4:
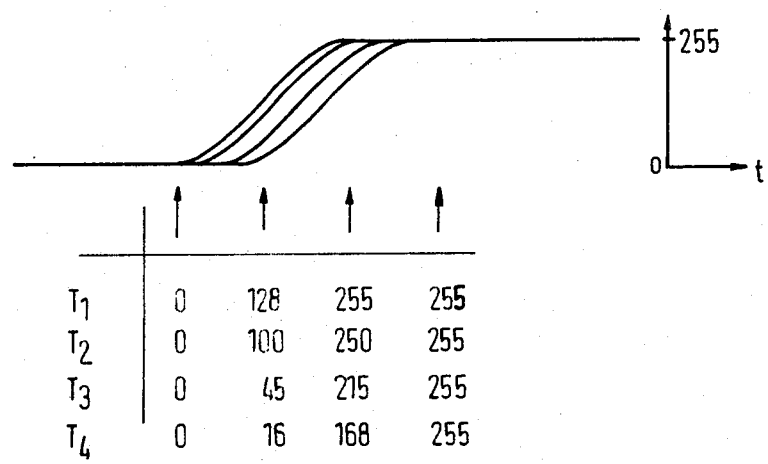
FIG. 4 is a diagram illustrating the principles of time-correction of the digital switching signal.
Figure 5:
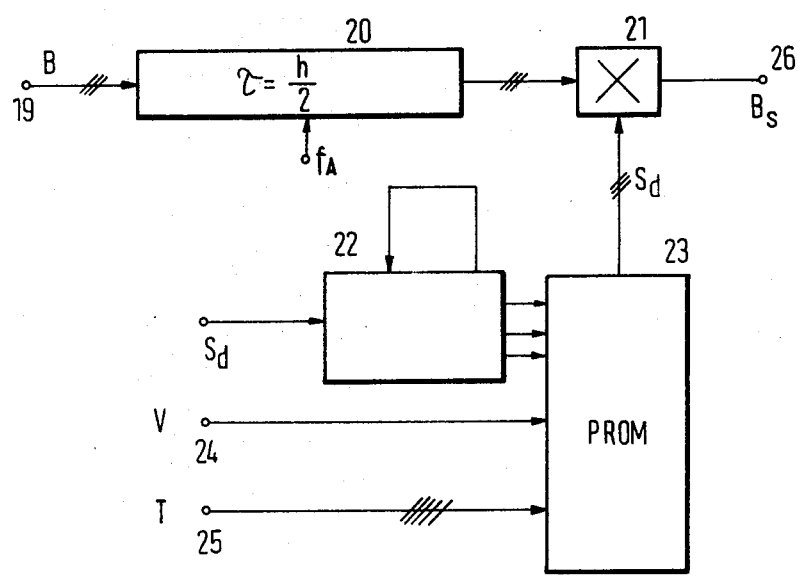
FIG. 5 shows a circuit arrangement operating according to the principles of FIG. 4.

FIG. 4 shows a table associating sets of four binary values with various values of T ($T_1$ to $T_4$). Each set of four binary values in the table defines the values of a corresponding set of four successive digital control signals which are generated at the digital scanning frequency to effect the progressive switching of a digital signal over three scanning periods, the value of each control signal determining the proportion of the digital signal present at the output of a switching circuit during the subsequent scanning period. The four control signals corresponding to each value of T collectively constitute the time-corrected switching signal associated with that value of T, and it will be seen that each set of four control signals effects a complete switching of the digital signal from 0 to 100% over the three scanning periods.

The analog signal above the table represents the four sets of digital control signals notionally converted by digital-analog conversion to analog form. It can readily be seen from the four superimposed analog signals that by appropriately defining the values of the control signals associated with each value of T a desired temporal position of the switching process can be achieved.

Although the table in FIG. 4 shows only four values of T, since the digital processing is based frequently on an 8-bit code, there may be up to $2^8$ values of T with a corresponding number of sets of four control signals. The number of succesive digital control signals—four in the example—may be chosen depending on the rise time of the signal. FIG. 5 shows an example of a circuit arrangement for carrying out this type of digital switching correction using the signals T und $S_d$ from FIG. 2. The digital picture signal B is supplied to a multiplier 21 from an input 19 via a phase equalisation circuit 20. The phase equalisation circuit 20 delays the signal B by a number of scanning periods equal to half the number of control signals provided for effecting the progressive switching of the digital signal, i.e. by two scanning periods in the present example. The digital switching signal $S_d$ is supplied to a sequence control circuit 22 which serves to control a programmable read-out memory (PROM) 23. Since in the calculation of the signal T a negative sign can occur at the subtractor 11 (FIG. 2) indicating a decreasing digital signal, a sign signal V is derived from the subtractor 11 which at 24 is supplied to the PROM 23. In addition the signal T is supplied at 25 to the PROM 23. The PROM 23 contains the full table of control signal values of which part is shown in FIG. 4, and upon receipt of the signal $S_d$ by the circuit 22 that set of four binary values corresponding in the table to the current value of the signal T are read out from the PROM 23 at the scanning frequency and applied as control signals to the multiplier 21 as a distributed time-corrected switching signal $S_d$ corr. The control signals are presented to the multiplier 21 in forward or reverse order in accordance with the sign of the signal V so as to either switch the signal B on or off at the output 26 according to whether the digital signal is rising above or falling below the threshold level k. In this manner there is obtained at output 26 a digital picture signal $B_S$ which is correctly switched in terms of time.

In the above embodiment the signal B was switched on at the output 26 when it exceeded the threshold k, and switched off when it fell below the threshold. However, the opposite can be achieved merely by reversing the order of the control signals, so that the signal B is switched off when it exceeds the threshold k and vice versa. Furthermore, it is to be understood that although the above has only described the switching on or off of a single digital picture signal, in general for video effects it will be necessary to switch two signals simultaneously, one being switched off while the other is switched on. In such case the same set of control signals can be used for switching both digital signals via a respective multiplier 21, except that the bits of one set of control signals must be inverted so that one signal is progressively switched on at the same rate as the other is switched off.

I claim:

1. A method for the time-correction of a digital switching signal which can occur only at discrete times as a consequence of the scanning process by which the digital signal to be switched is derived and which is therefore delayed relative to its desired time of occurrence, the method comprising deriving a time correction signal whose value is dependent upon the amount by which the digital switching signal is delayed relative to the desired time, and generating a plurality of control signals at the scanning frequency of the digital signal, the control signals collectively constituting the time-corrected switching signal and having values determined by the value of the time correction signal, the control signals being effective to produce a progressive switching of the digital signal over a plurality of scanning periods.

2. A method as claimed in claim 1, wherein the time correction signal is formed by dividing the difference between a given threshold value and the last scanned value of the digital signal before the threshold value by the difference between the first scanned value after the threshold and the last scanned value before the threshold.

3. A method as claimed in claim 1, wherein a plurality of sets of control signal values are stored in a programmable read-out memory (PROM) and are selectively read out in accordance with the value of the time correction signal.

* * * * *